Aug. 26, 1941.  E. LIHOTZKY  2,254,042
MIXING DEVICE FOR DOUGH AND THE LIKE
Filed Aug. 16, 1939
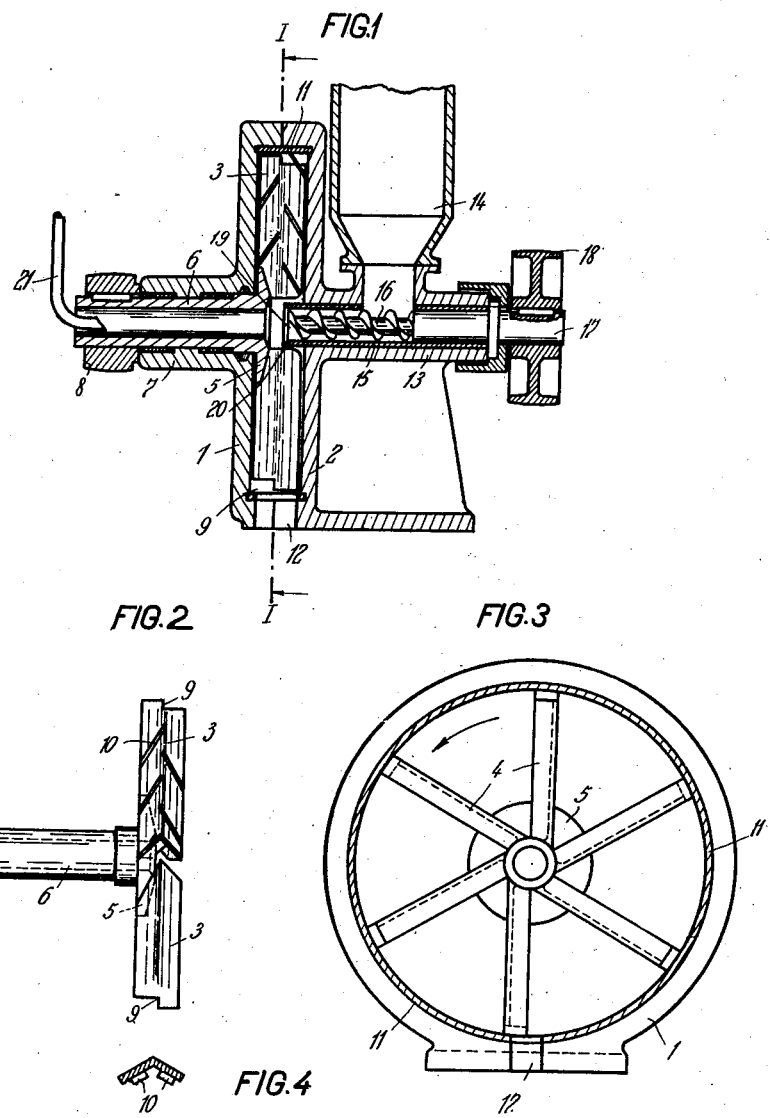

Patented Aug. 26, 1941

2,254,042

UNITED STATES PATENT OFFICE 2,254,042

MIXING DEVICE FOR DOUGH AND THE LIKE

Emil Lihotzky, Plattling, Germany

Application August 16, 1939, Serial No. 290,473
In Germany September 19, 1938

6 Claims. (Cl. 259—25)

The invention relates to a device for mixing dry material, particularly flour, semolina and the like, with liquid, as, for example, water, yolk of egg and the like.

More especially the invention relates to devices of the type known as centrifugal mixers in which the dry material and the liquid are fed to the centre of a rotary mixing body and are thence impelled to the circumference of the latter.

In known mixers of this type the materials to be mixed are fed to a disc rotating in a horizontal plane and are mixed by centrifugal action. The mixture is then discharged by the action of gravity, which may be assisted by the action of rotating scrapers, to the outlet of the mixing device.

Centrifugal mixers of this type are not well adapted for working up tough sticky dough masses, as part of the mass clings to the centrifugal body and gradually accumulates to an ever increasing extent. After a short time, even after several hours, these accumulations begin to ferment, whereby the production of dough is interfered with. It is a further objection that the scrapers get covered with a crusted mass, and that cleaning, which means stoppage of the mixer, requires a considerable time.

According to the invention the drawbacks of the known centrifugal mixers are avoided by providing a mixing body rotating in a vertical plane within a casing and comprising a plurality of arms, into the centre of which body the liquid and the dry material are fed in opposite directions, and after mixing are led from the centre along the arms to the circumference and well kneaded. At the end of each arm is a cut-away or gap which is laterally offset, for example, to the extent of half the arm width, from a cut-away in the next following arm. In the rotation of the arms the material arriving at the circumference of the mixer slips through the gap in each arm and impinges on the end of the following arm, passing in turn through the gap at the end of the latter. This operation is repeated from arm to arm. As a result, the material is well kneaded, and, after being well kneaded, passes by way of the discharge outlet from the mixer.

In order to promote the kneading operation there may be fitted to the arms bars or other projections. The material is thus additionally worked up on its passage from the centre of the mixing body to the circumference, as in consequence of the rotation of the arms it is flung from bar to bar. As the stream of goods flowing along each arm is of only small cross-sectional dimensions, there is effected a good supplemental kneading by impingement on successive bars.

Advantageously the arms or scoops are of angular cross-section or are concavo-convexly curved in cross-section, and are so arranged that their concave sides face the direction of rotation.

An embodiment of the invention is illustrated in the accompanying drawing in which Fig. 1 is a longitudinal vertical section of the centrifugal mixer.

Fig. 2 is a side elevation of the mixing body.

Fig. 3 is a section on the line I—I of Fig. 1.

Figs. 4 and 5 show two different cross-sectional forms of the arms of the mixing body.

In order to ensure easy cleaning of the mixer, the casing is advantageously formed in sections, and consists of halves 1, 2 which together form an annular chamber in which the mixing body 3 is arranged. In the example illustrated the mixing body 3 has six arms 4 (Fig. 3) which are connected with the conical hub 5 of the hollow shaft 6.

The hollow shaft 6 is journalled for rotation in the boss 7 of the half-casing 1 and carries at its free end a driving member, as, for example, a belt pulley 8.

The arms 4 are advantageously of angular cross-section (Fig. 4) or of concavo-convexly curved section (Fig. 5) and are each provided at the free end with a notch or cut-away 9. The arrangement is such that the notch or cut-away 9 of one arm 4 is laterally offset a distance of about half the arm width from the notch or cut-away of the following arm. This arrangement can be most simply arrived at by shortening alternate arms at their outer ends at the right hand half and at the left hand half (Fig. 2).

The arms 4 are so arranged that their concave or recessive sides face the direction of rotation. Further, at the side of each arm facing the direction of rotation there may be fitted bars 10 or other obstructions disposed obliquely to the longitudinal axis of the respective arm for effecting additional intimate kneading of the dough. The bars 10 at the right hand half are, for example, inclined upwardly from right to left and the bars 10 on the left hand half are inclined upwardly from left to right.

The mixing body 3 runs in an annular body 11 removably mounted in the casing 1, 2. The casing has also an outlet 12.

The half casing 2 is connected by way of a hollow shaft 13 with the feed-hopper 14 for the floury material.

Running in this hollow shaft 13 on a fixed bushing 15 is a conveyor screw 16. To the end 17 of the conveyor screw 16 projecting from the hollow shaft 13 there is secured a driving member, as, for example, a belt-pulley 18.

The bushing 15 and the conveyor screw 16 project into the centre of the mixing body 3. The bushing has an end outlet 19 with outwardly beveled edges 20 whereby the emerging floury material is guided evenly in the direction towards the arms 4.

The operation is as follows:

The floury material passes by way of the hopper 14 into the conveyor 16 driven by the belt-pulley 18 and thence by way of the outlet 19 of the bushing 15 to the centre of the mixing body. From the other side liquid, as, for example, water, egg-yolk or any suitable fluid mixture is introduced by way of a pipe 21 into the hollow shaft 6 and passes by way of the hub 5 to the centre of the mixing body 3 which is driven through the medium of the belt-pulley 8 and hollow shaft 6. The liquid and the floury material thus meet in the middle of the mixing body and are intimately admixed. The mixture then passes along the very rapidly rotating arms 6 to the circumference of the mixing body 3. At this point the material slips through the cut-away 9 of one arm and impinges on the end of the following arm. This operation is repeated from arm to arm. The repeated impact of the material on the arms effects good kneading before the goods emerge from the discharge opening 12 of the mixer.

The kneading action of the device is improved by providing on the arms 4 at the side facing the direction of rotation bars 10 or other obstructions. The material is then flung from bar to bar on its way from the centre of the mixing body 3 to the circumference in consequence of the rotation of the mixing body. By reason that the material travels uninterruptedly in small amounts along all the arms at high speed, it is extremely intimately kneaded in consequence of repeated impact on the bars and the ends of the following arms.

The kneaded material leaves the mixer by way of the discharge opening 12 which may be located at any convenient point of the casing 1, 2 and which extends over the entire axial length of the casing so that strippers for ejection of the goods are dispensed with.

What is claimed is:

1. A centrifugal mixer for mixing dry powdery material with liquid material comprising a casing forming a substantially circular cavity, a rotatable body having a central passage communicating with the central portion of said cavity and a plurality of radiating scoop-like arms extending substantially radially in said cavity, means for rotating said body, the side edges and a portion of each end edge of said arms lying closely adjacent the respective inner walls of said casing, means for feeding one of said materials through said passage in one direction into the central portion of said cavity, means forming a feed passage in said casing for feeding the other of said materials into the central portion of said cavity from the opposite direction, and outlet means in said casing for discharging the mixture of said materials after it has passed from the center to the periphery of said chamber, the arms being alternately shorter at the right and left-hand sides thereof whereby to provide consecutively staggered gaps.

2. A centrifugal mixer for mixing dry powdery material with liquid material comprising a casing forming a substantially circular cavity, a rotatable body having a central passage communicating with the central portion of said cavity and a plurality of radiating scoop-like arms extending substantially radially in said cavity, means for rotating said body, the side edges and a portion of each end edge of said arms lying closely adjacent the respective inner walls of said casing, means for feeding one of said materials through said passage in one direction into the central portion of said cavity, means forming a feed passage in said casing for feeding the other of said materials into the central portion of said cavity from the opposite direction, and outlet means in said casing for discharging the mixture of said material after it has passed from the center to the periphery of said chamber, the side of each arm facing the direction of rotation having a plurality of projections extending outwardly from the surface thereof, said projections being arranged obliquely with respect to the length of said arms.

3. A centrifugal mixer for mixing dry powdery material with liquid material comprising a casing forming a substantially circular cavity, a rotatable body having a central passage communicating with the central portion of said cavity and a plurality of radiating scoop-like arms extending substantially radially in said cavity, means for rotating said body, the side edges and a portion of each end edge of said arms lying closely adjacent the respective inner walls of said casing, means for feeding one of said materials through said passage in one direction into the central portion of said cavity, means forming a feed passage in said casing for feeding the other of said materials into the central portion of said cavity from the opposite direction, and outlet means in said casing for discharging the mixture of said materials after it has passed from the center to the periphery of said chamber, said casing comprising two mating parts fitting together at the periphery of said central cavity, an annular ring removably mounted in the periphery of said cavity, the outlet means in said casing comprising a passage through the wall thereof radially opposite said cavity, said ring having an opening therethrough for registry with said passage.

4. A centrifugal mixer for mixing dry powdery material with liquid material comprising a casing forming a substantially circular cavity, a rotatable body having a central passage communicating with the central portion of said cavity and a plurality of radiating scoop-like arms extending substantially radially in said cavity, means for rotating said body, the side edges and a portion of each end edge of said arms lying closely adjacent the respective inner walls of said casing, means for feeding one of said materials through said passage in one direction into the central portion of said cavity, means forming a feed passage in said casing for feeding the other of said materials into the central portion of said cavity from the opposite direction, and outlet means in said casing for discharging the mixture of said materials after it has passed from the center to the periphery of said chamber, said arms, in cross-section, being concave on one side with the concave sides facing the direction of rotation, and having a plurality of projections extending outwardly from the surface of said concave sides, said projections extending obliquely along the length of said arms with their inner ends nearer the longitudinal median lines of said arms than their outer ends, and with their inner ends lying radially outward of their outer ends with respect to said circular cavity.

5. A centrifugal mixer for mixing dry powdery material with liquid material comprising a casing forming a substantially circular cavity, a rotatable body having a central passage communicating with the central portion of said cavity and a plurality of radiating scoop-like arms extending substantially radially in said cavity, means for rotating said body, the side edges of said arms lying closely adjacent the inner side walls of said cavity, each of said arms having first and second outer end portions, the edge of the first outer end portions being spaced from the inner peripheral wall of the cavity, the edge of said second outer end portions lying closely adjacent said inner peripheral wall of the cavity, the second outer end portion on at least one of said arms being disposed in the path of the first outer end portion on another of said arms, means for feeding one of said materials through said passage in one direction into the central portion of said cavity, means forming a feed passage in said casing for feeding the other of said materials into the central portion of said cavity from the opposite direction, and outlet means in said casing for discharging the mixture of said materials after it has passed from the center to the periphery of said chamber.

6. A centrifugal mixer for mixing dry powdery material with liquid material comprising a casing forming a substantially circular cavity, a rotatable body having a central passage communicating with the central portion of said cavity and a plurality of radiating scoop-like arms extending substantially radially in said cavity, means for rotating said body, the side edges and a portion of each end edge of said arms lying closely adjacent the respective inner walls of said casing, means for feeding one of said materials through said passage in one direction into the central portion of said cavity, means forming a feed passage in said casing for feeding the other of said materials into the central portion of said cavity from the opposite direction, outlet means in said casing for discharging the mixture of said materials after it has passed from the center to the periphery of said chamber, said arms being substantially V-shaped in cross-section, the concave side of said arms facing the direction of rotation thereof, and a plurality of cleat-like projections on the concave sides of said arms, said projections extending obliquely along the length of said arms with their inner ends lying adjacent the longitudinal median line of said arms, the inner ends of said projections lying radially outward of the outer ends thereof with respect to said circular cavity.

EMIL LIHOTZKY.